Feb. 18, 1958   C. P. SMITH ET AL   2,823,879
FLYING CONTROL SYSTEMS FOR AIRCRAFT
Filed Nov. 16, 1955

United States Patent Office 2,823,879
Patented Feb. 18, 1958

2,823,879

FLYING CONTROL SYSTEMS FOR AIRCRAFT

Charles Philip Smith, Ramsey, Isle of Man, and Stanley George Glaze, Brierley Hill, England, assignors to H. M. Hobson Limited, London, England, a company of Great Britain Application November 16, 1955, Serial No. 547,252

Claims priority, application Great Britain December 14, 1954

4 Claims. (Cl. 244—83)

This invention relates to power operated flying control systems for aircraft of the kind comprising a servo motor for actuating a control surface of the aircraft, and a relay actuable by electrical signals transmitted thereto under control of the pilot's control member to operate the input member of the servo motor and so to adjust the position of the control surface.

A mechanical linkage between the pilot's control member and the input member of the servo motor has the disadvantage that it is unstable due to feedbacks produced by structural distortion of the aircraft and permits only low rates of response. It is accordingly advantageous to operate the servo motor electrically under normal conditions and to revert to operation through a mechanical linkage in the event of emergency only.

With this object in view, the invention provides a power operated flying control system of the above kind which comprises a normally inoperative mechanical linkage having at its opposite ends lost motion connections with the pilot's control member and with the input member respectively and means operating automatically, in the event of failure in the electrical system, to take up the lost motion at both ends of the linkage, so permitting of manual operation of the input member by the linkage under control of a pilot's control member.

Preferably the system comprises locks associated with the lost motion connections and biased to the operative position and means, e. g. solenoids, which are normally energized to hold the locks off but are de-energized to free the locks for movement to position to take up the lost motion on failure of the electrical power.

Figure 1:
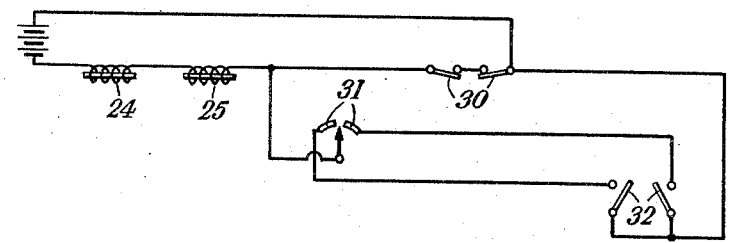
Figure 2:
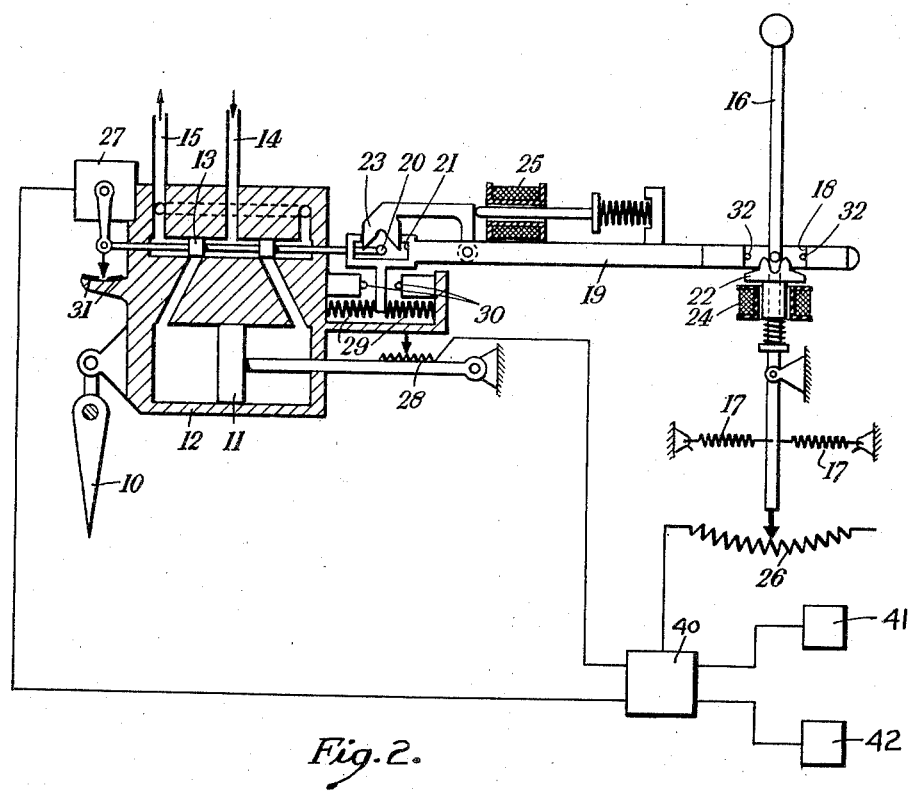

One embodiment of the invention will now be described in more detail, by way of example, with reference to the accompanying drawings, in which:

Fig. 1 is a circuit diagram, and
Fig. 2 is a diagram showing the operation of the system.

The control surface 10 is operated by a hydraulic servo motor comprising a fixed piston 11 and a movable cylinder 12 linked to the control surface. The input member of the servo motor is constituted by a control valve 13 which controls communication between the cylinder and a pressure inlet 14 and an exhaust outlet 15. As will be apparent, displacement of the control valve 13 from the neutral position shown causes the cylinder 12 to move in the same direction as and at a speed determined by the displacement of the control valve, the movement of the cylinder ceasing when the control valve has been returned to its neutral position in relation to the cylinder.

The pilot's control member 16, which is fitted with light centering springs 17, normally moves freely in a slot 18 in a mechanical linkage 19. A pin 20 on an extension of the control valve 13 also normally moves with clearance in a slot 21 at the other end of the linkage 19. An emergency anti-backlash lock 22 is provided for taking up the lost motion provided by the slot 18 and a lock 23 is pivoted to the linkage 19 and capable of engaging the pin 20 to lock the linkage to the control valve 13. The locks 22 and 23 are spring biased so that they tend to move to their operative positions. Normally, however, solenoids 24, 25 are energised to hold the locks 22, 23 respectively in the off positions shown in Fig. 2. Movement of the control member 16 then generates, by means of a potentiometer 26, electrical signals which are applied, via an amplifier 40, to an electromechanical transducer 27, which serves to move the control valve 13 to a position determined by the relative positions of the control member 16 and the cylinder 12. A potentiometer 28, operated by movement of the cylinder 12, sends an electrical feedback signal to the amplifier 40. If desired, the transducer 27 may also accept electrical signals from an auto-pilot 41 and/or from an auto-stabilizer 42 via said amplifier.

In the event of failure of the electrical power, the solenoids 24, 25 will automatically be de-energised to allow the locks 22, 23 to come into operation to lock respectively the pilot's control member 16 and the control valve 13 to the linkage 19, thus giving the pilot mechanical control over the servomotor. If the control valve 13 should stick in the open position, the pilot will automatically move his control member 16 in the direction to oppose runaway movement of the servomotor, sufficient to take up the backlash in the slot 18, and moving the linkage 19 against the load of one or other of a pair of springs 29, so actuating one or other of a pair of trip switches 30, thus breaking the circuit to the solenoids 24, 25, and causing the locks 22, 23 to engage. When said trip switches 30 are closed they establish a circuit to energize the solenoids 24, 25 from the power source of the electrical signalling system which is indicated diagrammatically in Fig. 1 as a battery.

The pilot may sometimes move his control member 16 under conditions of effective operation of the electrical system sufficiently to displace the linkage 19 and actuate one of the switches 30. To prevent this resulting in engagement of the locks, sign switches 31 are provided in association with the relay valve 13 and override switches 32 are disposed at the ends of the slot 18. If the electrical system is functioning properly when the control member 16 is moved sufficiently to take up the backlash in the slot 18, the control valve 13 will be moving in the same direction as the control member 16 and switches 31, 32 of the same hand will be closed. As shown in Fig. 1, this will establish a circuit in parallel with the trip switches 30, so that opening of a trip switch will not result in de-energization of the solenoid or application of the locks.

In the event however of valve seizure, the pilot will move his control member 16 in the direction opposite to that in which the control valve has moved, the closed switches 31, 32 will be of opposite hand and opening of one of the trip switches 30 will de-energize the solenoids and apply the locks. The pilot will then be able to apply manual effort to the valve 13 through the linkage 19 to move it from the seized position.

What we claim as our invention and desire to secure by Letters Patent is:

1. A power operated flying control system for aircraft, comprising a control surface, a fluid pressure operated servomotor having an input member and an output member, said output member being connected to operate said control surface, an electro-mechanical transducer for actuating said input member, a pilot's control member, an electrical signalling system operable by said control member to cause said transducer to actuate said input member and thereby to move said control surface to a position corresponding to the position of said control member, a normally inoperative mechanical linkage having at its opposite ends lost motion connections with said control member and with said input member respectively and means operating automatically, in response to failure of said electrical system, to take up the lost motion at both ends of the linkage, thereby permitting of manual operation of the input member by the control member through said linkage.

2. A power operated flying control system for aircraft, comprising a control surface, a fluid pressure operated servomotor having an input member and an output member, said output member being connected to operate said control surface, an electro-mechanical transducer for actuating said input member, a pilot's control member, an electrical signalling system operable by said control member to cause said transducer to actuate said input member and thereby to move said control surface to a position corresponding to the position of said control member, a normally inoperative mechanical linkage having at its opposite ends lost motion connections with said control member and with said input member respectively, a pair of locks, one associated with each of said lost motion connections, means biasing said locks to operative position to take up lost motion in said connections, and a pair of electromagnetic devices, one associated with each lock, said electromagnetic devices being normally energized by an energizing circuit to maintain said locks in inoperative positions but being de-energized, on failure of said signalling system, to permit said locks to move to their operative positions.

3. A control system according to claim 2, comprising trip switches connected in series with the electromagnetic devices and respectively operable by movement of the linkage in opposite directions, while the electrical signalling system is effective and after lost motion between the control member and the linkage has been taken up, to break the circuit energizing said electromagnetic devices.

4. A control system according to claim 3, comprising sign switches arranged respectively to be operated by movement of the input member in one or the other direction from a neutral position and override switches arranged to be actuated respectively by the control member when moved in one or the other direction to take up the lost motion connection with the linkage, said sign and override switches establishing an energizing circuit to said electromagnetic devices in parallel with the circuit controlled by the trip switches when and only when the control member moves in the same direction as the input member.

References Cited in the file of this patent
UNITED STATES PATENTS

| | | |
|---|---|---|
| 2,487,116 | Eaton | Nov. 8, 1949 |
| 2,678,177 | Chenery et al. | May 11, 1954 |